(No Model.)
G. PHILION.
PULLEY.
No. 438,822.  Patented Oct. 21, 1890.
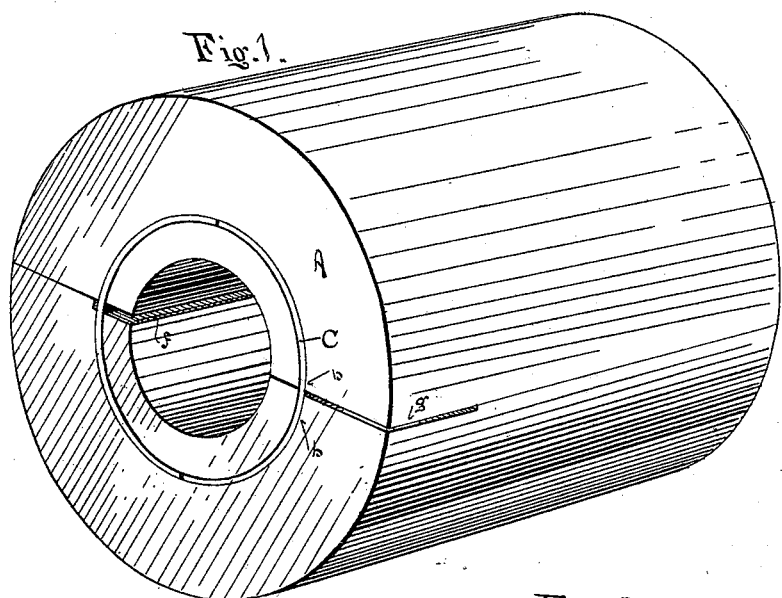
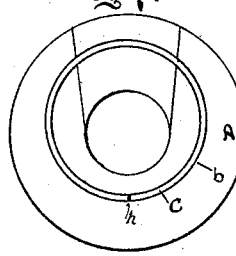
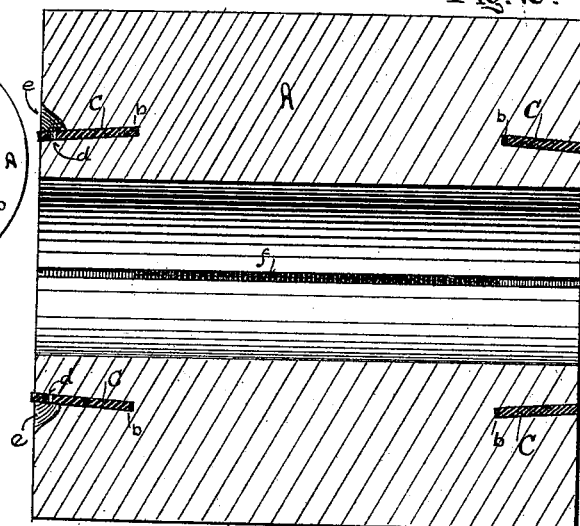
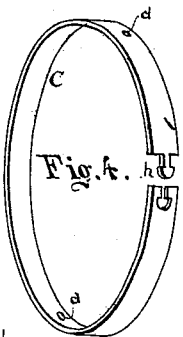
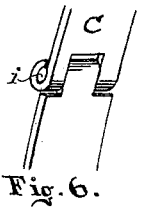
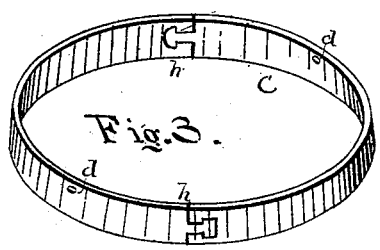
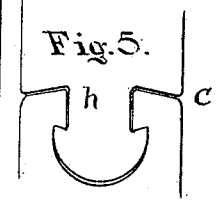
Attest
A. H. Smith
R. W. Smith
Inventor.
George Philion
By his Atty.
R. W. Smith

UNITED STATES PATENT OFFICE.

GEORGE PHILION, OF MISHAWAKA, INDIANA, ASSIGNOR TO THE DODGE MANUFACTURING COMPANY, OF SAME PLACE.

PULLEY.

SPECIFICATION forming part of Letters Patent No. 438,822, dated October 21, 1890.

Application filed May 19, 1890. Serial No. 352,294. (No model.)

*To all whom it may concern:*

Be it known that I, GEORGE PHILION, of Mishawaka, in the county of St. Joseph and State of Indiana, have invented new and useful Improvements in Pulleys; and I do hereby declare that the following is a full and accurate description of the same, reference being had to the accompanying drawings, wherein—

Figure 1 is a perspective view of my pulley. Fig. 2 is a longitudinal section of the same. Fig. 3 is a perspective view of the sectional clamping-band. Figs. 4, 5, and 6 represent modifications of the clamping-band. Fig. 7 represents a modification of the pulley.

The necessity for and advantage of a split pulley are now well known and not denied; but heretofore there has been an unsatisfied demand for a split pulley of very small diameter in comparison with the diameter of the shaft upon which said pulley is to be placed. Before this invention the smallest split pulley required about two inches of wood exterior to the shaft within which to place the fastenings. An example of such a pulley is found in my patent numbered 413,628; but with my present invention it is a common practice with me to make split pulleys having not more than one-half an inch of wood exterior to the shaft, and I have made many as small as that, and thus my invention accomplishes a result not attainable by other means.

My invention consists in a pulley split or separable on lines which pass through the center and periphery. The division may be in equal or unequal parts; that is immaterial, but it is most convenient to divide on a plane which passes through the center, as shown in Fig. 1. In each end of the pulley a groove is made slightly increasing in diameter as it penetrates the pulley, and as this groove is most conveniently made while the pulley is in the lathe it will be concentric with the axis; but if for any reason the pulley is divided into unequal parts it may be advantageous to place said grooves eccentric to the center, as shown in Fig. 7.

A is my pulley divided in two parts and provided in each end with a groove $b\ b$ having an outward inclination as it penetrates the pulley. The ring or hoop C, which enters said groove and forces together the two parts of the pulley, is also with one or more points of separation, so that it can be put on the shaft at any place the same as the pulley can.

I prefer to make the hoop C in two parts, because if made in one part it would be necessary to spring it either before or after going on the shaft, and in so doing there would be liability in bending it out of its true circle. It might be made of spring-tempered metal, as shown in Fig. 4, and thereby avoid this risk; but the cost would be greatly increased without corresponding benefit.

It is desirable that the separable ends of the hoop C shall be fashioned so that they will readily interlock and hold securely. This may be accomplished in a great variety of ways well known to the skilled mechanic, some of which are shown in Figs. 3, 4, 5, and 6, and it is not necessary to attempt a specification of all of them.

I have employed an ordinary lock-joint, as shown at $h$, which may be punched and finished at a single operation. The pintle-joint shown in Fig. 6 is also a good and convenient fastening.

The hoop C is slightly elongated at one edge and thereby beveled to correspond with the groove $b$, so as to drive into said groove with the action of a wedge to force the two parts of the pulley together, or upon the shaft, to be clamped thereon. A variety of ways may be employed to remove the hoop when it is desired to take the pulley from the shaft. Some of these are shown. A hole $d$ may be made in the hoop, into which a pointed instrument may be inserted. This hole may be made accessible by an under-cut $e$. A rabbet $f$ has also been made in the inner side of the pulley, and a proper hook may then be inserted to engage the inner edge of the hoop. A saw-cut $g$ has also been employed to enable a thin lever to be inserted from the outside. When the pintle-fastening is employed, it is necessary to bore a hole to admit the round of the hinge-loops, and this hole is bored deep enough to admit the pintle $i$ being driven out of place to release the ends of the hoop.

Having described my invention, I claim—

1. A separable or split pulley provided with an end groove, combined with a separable hoop or ring adapted to clamp the pulley in place by the forcing of the hoop into said groove, substantially as set forth.

2. A separable or split pulley divided on the plane of the axis, provided with a groove $b$ in each end, and separable hoops, the ends of which are provided, respectively, with a recess and projection adapted to interlock with each other and to hold the pulley in place when forced into said grooves, substantially as set forth.

3. A solid separable pulley A, provided in its ends with grooves $b$, inclined outwardly and toward the axis, and the divided hoop C, correspondingly inclined and larger around the inner than around the outer edges, and having means for securing together their ends, substantially as set forth.

GEORGE PHILION.

Witnesses:
M. W. MIX,
W. B. HOSFORD.